2,812,619
Patented Nov. 12, 1957

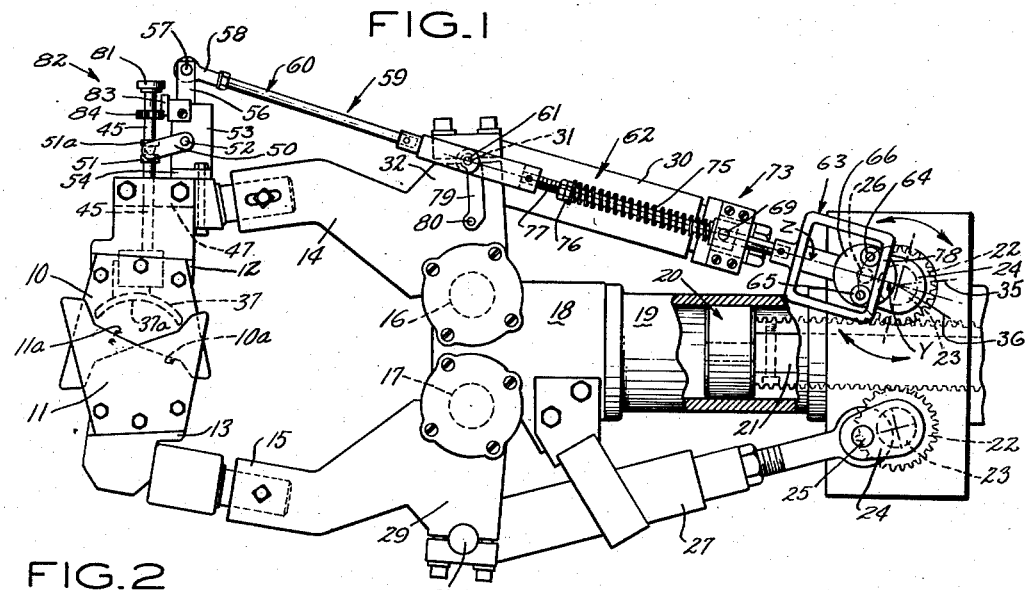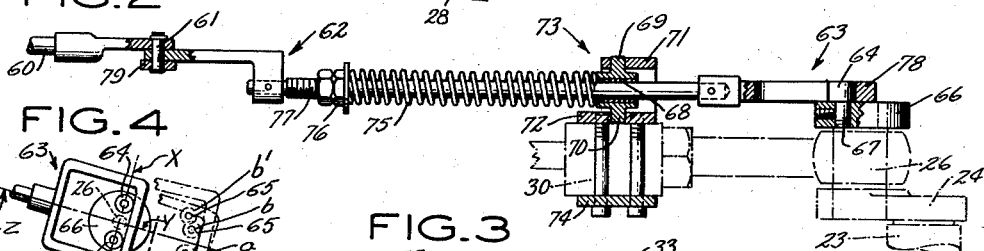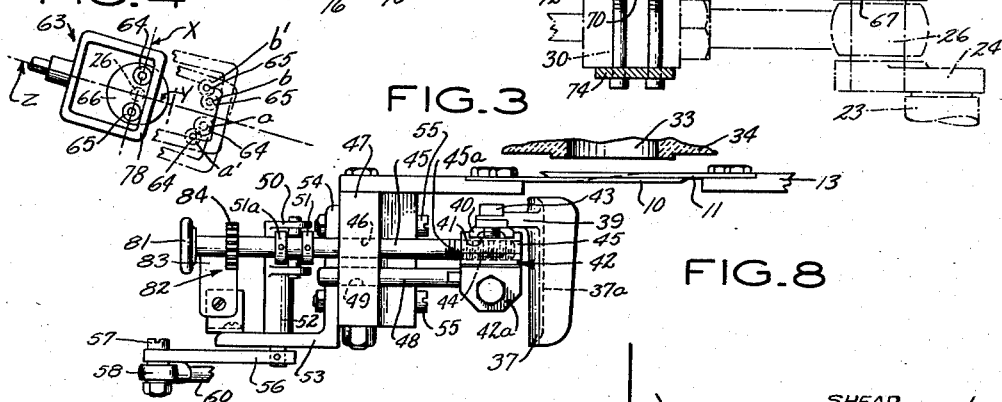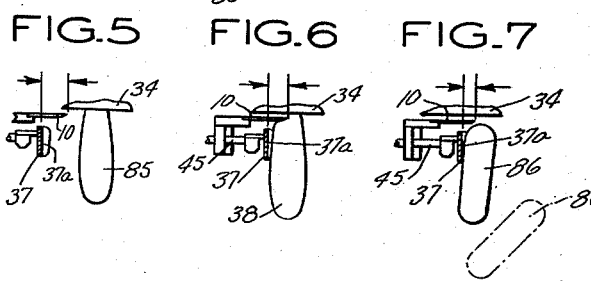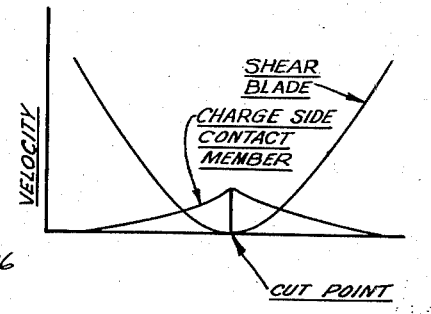

2,812,619

GLASS FEEDER SHEARS PROVIDED WITH CHARGE TURNING MECHANISM

Frederick J. Wythe, Hebron, Conn., assignor to Emhart Manufacturing Company, Hartford, Conn., a corporation of Delaware Application April 5, 1954, Serial No. 420,955

7 Claims. (Cl. 49—14)

This invention relates generally to improvements in glass feeder shears for cutting off charges from successive columns or masses of molten glass in suspension from the glass discharge outlet of a feeder.

Glass feeder shears generally are provided with charge guiding means arranged to contact each severed charge of molten glass at the time of its severance at the side of the charge opposite the lower shear blade so as to keep the charge substantially vertical as it falls from the shearing plane downwardly toward a mold or other charge receiver.

It is desirable, however, in the production of certain glass articles, particularly television face plates and other relatively flat articles, to deliver the glass charges therefor to their molds so that each such charge will land on its side in its mold cavity or at least will be inclined from the horizontal less than from the vertical so that it quickly will assume a horizontal position on the bottom of its mold cavity after the first contact therewith of any portion of the charge.

An object of the present invention therefore is to provide reliable and effective means to impart a turning moment to each severed charge as it is cut off by a feeder shears so that the falling charge will land on its side or quickly assume that position in its underneath charge receiver.

A more specific object of the invention is to provide a charge side contact member associated with and positioned close beneath the lower blade of glass feeder shears and operable on each cutting stroke of the shear blades to contact the side of the upper end portion of the severed charge so as to impart a relatively large turning moment to the charge at the instant of its severance, the side contact member being movable with the lower shear blade and also relatively thereto so as to be moving in the direction of the longitudinal axis of the charge at a relatively high velocity at the instant of cutting when the associate shear blade approaches zero velocity.

Other objects and advantages of the invention will hereinafter be stated or will become obvious from the following description of a practical embodiment of the invention as shown in the accompanying drawings in which:

Fig. 1 is a plan view of glass feeder shears provided with a charge turning means constructed and arranged in accordance with the invention, a pressure fluid cylinder of the operating mechanism of the shears being partially broken away to reveal parts that otherwise would be hidden;

Fig. 2 is a fragmentary view, mainly in side elevation, with parts shown in section, of a cam actuated linkage for imparting desirable movements to the charge side contact member;

Fig. 3 is a fragmentary view, mainly in elevation, showing the blades of the feeder shears closed beneath the glass feed outlet of a feeder, only a fragmentary portion of the feeder outlet structure being shown and that in section, the view also showing the charge side contact member of the charge turning means in a position that it occupies when the shear blades are fully closed;

Fig. 4 is a fragmentary plan view of cooperative cam follower and cam means of the operating mechanism for imparting cycles of movement to the charge side contact member, the view showing in full lines the relative positions of the cam followers and cam at the instant of severance of a charge and also in dot-and-dash lines two different other positions of these elements when the shear blades have been fully opened;

Fig. 5 is a fragmentary and somewhat diagrammatic view of the feeder outlet, a charge mass in suspension therefrom and the lower shear blade and associate charge contact member at a time when the blade is fully retracted;

Fig. 6 is a view similar to Fig. 5 but showing the relative positions of the parts referred to at a time when the lower blade has started but not completed its cutting action on the suspended charge mass;

Fig. 7 is a view like Fig. 6 but showing the lower blade in its fully projected position when it has completed its cutting action and showing the charge side contact member in its fully projected position, the view also showing in dot-and-dash lines the turning of the charge in response to the turning moment imparted thereto and the final position assumed by the charge in the cavity of its charge receiver; and Fig. 8 is a chart showing the velocity curves of the lower shear blade and the associate charge side contact member during concurrent cycles of movement of these elements.

A glass feeder shear mechanism to which the invention may be applied is shown in Fig. 1 as comprising a lower shear blade 10 and a cooperative upper shear blade 11 respectively fixed on inturned blade carrying plates or arms 12 and 13 respectively on the outer or free end portions of a lower blade carrying shear arm 14 and an upper blade carrying shear arm 15, respectively. The shear blades preferably have notched or V-shaped cutting edges, indicated at 10a and 11a, respectively.

The shear arms 14 and 15 are mounted to turn about the axes of adjacent vertical supporting shafts 16 and 17, respectively. These are provided in adjacent parallel relation on a bracket 18 which projects forwardly from the adjacent end of a horizontal pressure fluid cylinder 19. Movably disposed within the power cylinder 19 is a piston means generally indicated at 20 which includes a double-sided rack bar means 21 engaged with pinions 22 fixed on vertical crank shafts 23. The crank shafts 23 are provided at their upper ends with cranks 24, each of which is provided near its extremity with an upstanding crank pin 25 or 26, respectively. The crank pin 25 is operatively connected by a link 27 with the upper blade carrying shear arm 15 through the agency of a vertical pivot pin 28 mounted in a short outturned arm or knuckle 29 on the pivoted end portion of arm 15. The crank pin 26 is similarly connected by a similar link, indicated at 30, with a vertical pivot element 31 carried by an outturned short arm or knuckle portion 32 on the pivoted end portion of the lower blade carrying arm 14. The arrangement is such that when the piston means 20 is moved in the cylinder 19 from one end of the latter toward the opposite end, the shear arms 14 and 15 will be swung from fully opened positions toward each other so that the shear blades will be closed at about the midstroke of the piston means in the cylinder and then will be returned to their fully opened positions during the remaining travel of the piston means in the cylinder.

The cranks occupy the positions shown in Fig. 1 at the instant of completion of each cutting action by the shear blades, the shears being positioned by suitable supporting means (not shown) so that the shear blades are then closed at the vertical center line or axis of the glass feed outlet opening 33 in a feeder glass container bottom 34. Movement of the piston means 20 in the cylinder 19 from one end of the cylinder to the other causes a turning movement of the cranks 24 through slightly less than 360°, these movements of the cranks about the axes of their respective vertical crank shafts being reversed by reversal of the direction of reciprocatory movements of the piston means in the cylinder.

When the shear blades are fully retracted and the shear arms are at the limits of their strokes away from each other, the crank pin 26 will be on a radial line 35 or 36, Fig. 1, according to whether the piston means 20 is at the end of the cylinder 19 nearest to the shear blades or at the opposite and more remote end of the cylinder.

The reciprocatory movements of the piston means in cylinder 19 may be caused by any suitable known means (not shown). This particular shear mechanism, which effects closing of the shear blades at each midstroke of the piston means in the cylinder, does not per se form part of the present invention but is substantially as disclosed in the copending application of William T. Honiss, Serial No. 237,342, filed July 18, 1951 for High Torque Shears on which Patent No. 2,678,518 issued on May 18, 1954. Any suitable known shear mechanism may be employed.

Referring now more particularly to the structure of the mechanism for imparting the desired turning moment to each charge that is severed by a closing of the shear blades, the charge contact member, indicated at 37, Figs. 1, 5 to 7 inclusive, may be a small plate or plate-like rigid entity made of a suitable metal or other material and shaped so as to have a contact face 37a conforming approximately in contour to the surface of the adjacent side portion of a charge mass of molten glass in suspension from the feeder outlet when the charge mass has been fully formed, ready for severance, as in the case of the charge mass indicated at 38 in Fig. 6. Thus, the contact face 37a of contact member 37 may be arcuate in transverse configuration and substantially straight vertically, or otherwise described, may have the shape of the inner face of a segment of a vertically disposed cylinder. Member 37 is provided with an integral or otherwise fixed attaching arm 39 projecting from the back of the upper portion thereof. Arm 39 carries a downwardly turned supporting shoe 40 which is slidable in a transverse guide way 41 in the top of a block 42. The shoe 40 is releasably secured to the block 42 in a predetermined position along the guide way 41 by a cap screw 43 or any other suitable fastening means. Block 42 is provided with a fore-and-aft threaded bore 44 into which is screwed the threaded end portion 45a of a supporting rod 45 which extends slidably through a fore-and-aft bore 46 in outer end portion 47 of shear arm 14. A guide rod 48 is held at one end by a clamp 42a on the bottom of the block 42 so as to project rigidly from such block beneath and parallel to the rod 45. The rod 48 extends slidably through a guide bore 49 in part 47 and serves to prevent any turning movement of the block 42 and charge contact element 37 about the axis of rod 45.

Rod 45 may be shifted axially back and forth through the bore 46 in the outer end portion 47 of the shear arm by a shipper fork 50 having prongs arranged to straddle a portion of rod 45 between a pair of spaced adjacent fixed collars 51 and 51a on the rod. Shipper fork 50 is operable to thus shift the rod 45 by a vertically disposed rock shaft 52 which is carried by a horizontal arm 53 of a bracket 54 which is secured, as by bolts 55, to the outer end portion of shear arm 14. Rock shaft 52 carries an outwardly extending rocker arm 56. The outer end of rocker arm 56 is operatively connected by pivot means 57 to the outer end 58 of a connecting rod generally designated 59.

The rod 59 includes an outer end section 60, connected at its outer end to rocker arm 56 as just explained and connected at its inner end by a vertical pivot or hinge pin 61 to the outer end of a main rod section 62. The end portion of rod section 62 remote from the rocker arm 56 is in the form of a rectangular open cam cage or frame 63 enclosing a pair of cam followers 64 and 65, respectively, on a disk 66 which is fixed to the extreme upper end portion of crank pin 26.

The respective cam followers 64 and 65 may be in the form of rollers on pins, such as that indicated at 67 in Fig. 2, by which the rollers are mounted at relatively fixed eccentric positions on disk 66 equi-distant from the vertical axis of oscillation of the crank and also at diametrically opposite sides of and equi-distant from the axis of the crank pin. While other locations of the cam followers on the crank pin disk may be selected, the arrangement as shown, and preferably, is such that a straight line, as indicated at X, Figs. 1 and 4, between the center lines of the two cam followers passes through the center line of crank pin 26 and is perpendicular to the longitudinal axis, indicated by line Y, of the crank.

The section 62 of connecting rod 59 extends slidably through a bushing 68 having upper and lower trunnions 69 and 70, respectively, journalled in suitable openings in the top 71 and bottom 72, of a box 73 which is mounted on the link 30 and rigidly secured in place thereon by clamping means 74. A compression coil spring 75 encircles the section 62 of the connecting rod 59 between the bushing 70 and a compression adjusting nut 76 on an adjacent portion of such rod, screw threads being provided as indicated at 77 to permit desirable adjustment of the nut along the rod. The arrangement is such that the spring 75 exerts a sufficient pressure on nut 76 to urge the rod section 62 continuously toward rocker arm 56 so that one or the other or both of cam followers 64 and 65 will be continuously engaged by the rearward end member 78 of the cam frame or cage 63. A strap 79 connects a fixed pivot 80 on the pivoted end portion of arm 14 with a floating pivot element 61 by which the sections 60 and 62 of the connecting rod are hingedly connected to each other. The arrangement is to prevent binding or undue friction between relatively moving parts when the connecting rod is swung back and forth by the swinging movements of the supporting shear arm 14 and the shear arm operating connections and also is moved independently of the shear arm by its own operating connections. The arrangement is such that the axial line, indicated at Z in Figs. 1 and 4, of the connecting rod 59 and the axial line Y of crank 24 will form a substantially straight line when the crank is at the end of its throw as shown in Fig. 1.

The path of reciprocatory movements of the charge side contact element 37 relative to its associate lower shear blade 10 may be adjusted by turning the rod 45 about its own axis, as by a handle 81 on the outer end of such rod. A friction type latching device 82 retains the rod 45 against accidental or unintended turning about its own axis. This may comprise a spring latch plate 83 mounted on the bracket 53 so as to bear against a peripherally toothed cooperative latch wheel 84 which is fast on the rod 45. Turning of the rod 45 about its own axis will adjust the block 42 forwardly or rearwardly according to the direction of such turning movement. This will effect a fore-or-aft adjustment of the path of reciprocatory movements of the glass charge side contact element 37 by its own operating mechanism and relative to the cutting edge of the associate lower shear blade 10 and to the axial line of the glass feed outlet 33 with which the shear mechanism herein referred to is associated.

In operation, the shear blades 10 and 11 will be closed as shown in Figs. 1 and 3 at about the midstroke in either direction of the piston means 20 in cylinder 19. A forward stroke of such piston means from the rearward end of the cylinder will cause the crank pin 26 to be moved counterclockwise from position 35, Fig. 1, to the position shown in that view when the shear blades are closed and thereafter to the position 36 as the shear blades are opened. The return or rearward stroke of the operating piston means will return the crank pin clockwise from position 36 through the position shown in Fig. 1 to position 35. The velocity curve of each shear blade during each such cycle of closing and opening movements will be sinusoidal and substantially as shown by the chart of Fig. 8. Fig. 5 shows the fully opened or retracted positions of the lower shear blade 10 with respect to an accumulating suspended mold charge mass, indicated at 85, below the glass feed outlet structure 34. Fig. 6 shows the lower shear blade after its cutting action on the suspended mold charge mass, now designated 38, has commenced but has not been completed. The glass charge side contact member 37 will have been moved against the side of the suspended mold charge mass and will be moving at a high and increasing velocity which will be at a maximum at the end of the charge side striking stroke of member 37 as shown in Fig. 7. At this time, the shear blade 10 will have completed its cutting stroke and, in conjunction with the upper shear blade, which is not shown in Fig. 7, will have cut off the charge, indicated at 86, so that it may fall into an underneath charge receiver.

While the crank pin 26 is being moved from line 35, Fig. 1, to the position shown in the same view, the cam followers 64 and 65 are moving from positions indicated at *a* and *b'*, respectively, in Fig. 4 to the full line positions of both Figs. 1 and 4. Movement of crank pin 26 clockwise from position 36 in Fig. 1 will be attended by movement of cam followers 65 and 64 from positions *b* and *a'* in Fig. 4 to the full line positions thereof shown in Figs. 1 and 4. The striker member 37 thus has a cosine motion with respect to the shear blade 10 and is moving at its maximum speed when the shear blade completes its cutting stroke. At the instant of severance of the charge mass 38 by the co-acting shear blades, when the velocity of these blades is zero, the contact member 37 will strike the side of the upper end of the severed charge with high velocity so as to impart large turning motion to the severed charge 86, Fig. 7. Compare the velocity curves of the shear blade and contact member 37 as shown in Fig. 8.

The severed charge will turn during its fall and will drop to a completely horizontal position in the cavity 87 of a suitable flat-bottomed mold or other charge receiver 88 quickly after the first contact of any portion of the charge with the bottom of the mold cavity. In the example shown, the mold 88 is indicated as moving to the left or counter to the direction of the turning moment imparted to the falling charge 86 so as to aid completion of turning of the charge to a horizontal position. The mold 88 may be stationary and suitably positioned beneath the line of fall of the charge.

The severed charges may be relatively large and heavy, having a diameter which may be as large as 3" and a weight of 28 pounds or more. Smaller charges may of course be given a turning moment by mechanism of the invention. Shear marks at the end of the charges will be kept away from the faces of the formed television face plates or other flat articles made from charges acted on by the charge turning means.

The invention is not limited to details of the illustrative embodiment thereof shown in the drawings and herein described as various changes in and modifications thereof will now be obvious to the skilled workers in the art.

I claim:

1. In combination, a glass feeder shear mechanism comprising a pair of cooperative shear blades having cutting edges relatively movable from positions at opposite sides of a mass of molten glass hanging freely from a feeder outlet to positions to meet at the axial line of the hanging mass so as to sever a mold charge therefrom, means to operate said shear blades to effect repeated charge severing strokes thereof, a charge side contact member mounted beneath and adjacent to one of said shear blades for movement with the cutting edge thereof and also movable independently thereof relative to the axial line of said mass, and means to actuate said contact member to move it independently of and in the same direction as said one of the shear blades during each charge severing stroke thereof and at a higher velocity to cause the contact member to strike the adjacent side of the upper end portion of the severed charge and impart a turning moment thereto at the instant of its severance by said shear blades.

2. The combination specified by claim 1 wherein the cutting edge portion of one of said blades overlaps the cutting edge portion of the other when they meet at the axial line of the hanging mass of molten glass and wherein said charge side contact member is mounted beneath and for movement with the cutting edge of the lower of said blades.

3. In combination, a shear blade having a glass cutting edge, means pivotally supporting said shear blade for swinging movements about a vertical axis between a retracted inactive position at which the cutting edge of the blade is disposed at one side of a mold charge mass of molten glass hanging freely from an outlet of a glass feeder and a projected active position at the axial line of said mass, a glass contact member mounted beneath and adjacent to said blade and connected therewith to be moved bodily with the blade toward and from the axial line of said hanging mold charge mass and to be further movable independently of the blade toward and from said axial line, means to move said blade with a sinusoidal motion from its retracted inactive position to its projected active position and back to its retracted position, and means co-acting with the means to move said shear blade to cause a concurrent cosine motion of the glass contact member relative to said shear blade so that said contact member will be moving in the direction of said axial line at a relatively high velocity when the shear blade approaches zero velocity.

4. The method of loading a shallow-cavitied mold suitable for the formation therein of a television face plate or other relatively flat glass article which comprises suspending a mold charge mass of molten glass so that it hangs freely from a feeder outlet, cutting transversely through said mass to sever therefrom a freely falling mold charge containing enough glass for the relatively flat article desired, positioning a mold suitable for said article in the path of fall of the severed charge at a distance below the plane of severance of the charge greater than the length of the severed charge, and imparting a turning moment to the upper end portion of the charge at the time of its severance to cause the freely falling charge to turn from a vertical toward a horizontal posture during its fall into the cavity of the underneath mold.

5. The method of loading a shallow-cavitied mold suitable for the formation therein of a television face plate or other relatively flat glass article which comprises suspending a mold charge mass of molten glass so that it hangs freely from a feeder outlet, cutting transversely through said mass to sever therefrom a freely falling mold charge containing enough glass for the relatively flat article desired, positioning a mold suitable for said article in the path of fall of the severed charge at a distance below the plane of severance of the charge greater than the length of the severed charge, imparting a turning moment to the upper end portion of the charge at the time of its severance to cause the freely falling charge to turn from a vertical toward a horizontal posture during its fall into the cavity of the underneath mold, and moving the mold horizontally in the direction to lay the charge on its side in the mold cavity should such charge be inclined slightly from the horizontal at the time of first contact of any part of the charge with the bottom of the mold cavity.

6. The combination with a glass feeder shears comprising a pair of relatively upper and lower blades closable at the downwardly extended axial line of the feeder outlet and openable to positions respectively located at opposite sides of said axial line and operating means for said shear blades including a crank mounted to turn about a fixed vertical axis and having a pin operatively connected to the lower blade, a mold charge side contact member mounted to move bodily with said lower blade in a position directly therebeneath toward and away from said axial line and also independently of said lower blade toward and from said axial line, and actuating means for the contact member operatively connecting it with said crank so as to produce a cosine motion of the charge side contact member relative to the lower shear blade.

7. The combination specified by claim 6 wherein said actuating means for the contact member comprises a disk fixed on said crank pin, a pair of cam followers on said disk respectively located at opposite sides of and equi-distant from the axis of the crank pin and equi-distant from the axis of turning movement of the crank, an open cam frame enclosing said cam followers and the crank pin, said cam frame including a cross member at one end thereof, and a lever and linkage system operatively connecting said frame with said movably mounted contact member, including spring means acting to maintain said frame cross member in bearing contact with one or the other or both said cam followers during each cycle of turning movements of said crank.

References Cited in the file of this patent

UNITED STATES PATENTS

| | | |
|---|---|---|
| 1,926,823 | Stewart | Sept. 12, 1933 |
| 1,999,444 | Curtis | Apr. 30, 1935 |
| 2,179,317 | Barnard | Nov. 7, 1939 |
| 2,205,868 | Wadsworth | June 25, 1940 |
| 2,678,518 | Honiss | May 18, 1954 |
| 2,681,530 | Peiler | June 22, 1954 |